Jan. 18, 1944. M. DE SIMO ET AL 2,339,560
PRODUCTION OF DIENES
Filed May 27, 1941 2 Sheets-Sheet 2
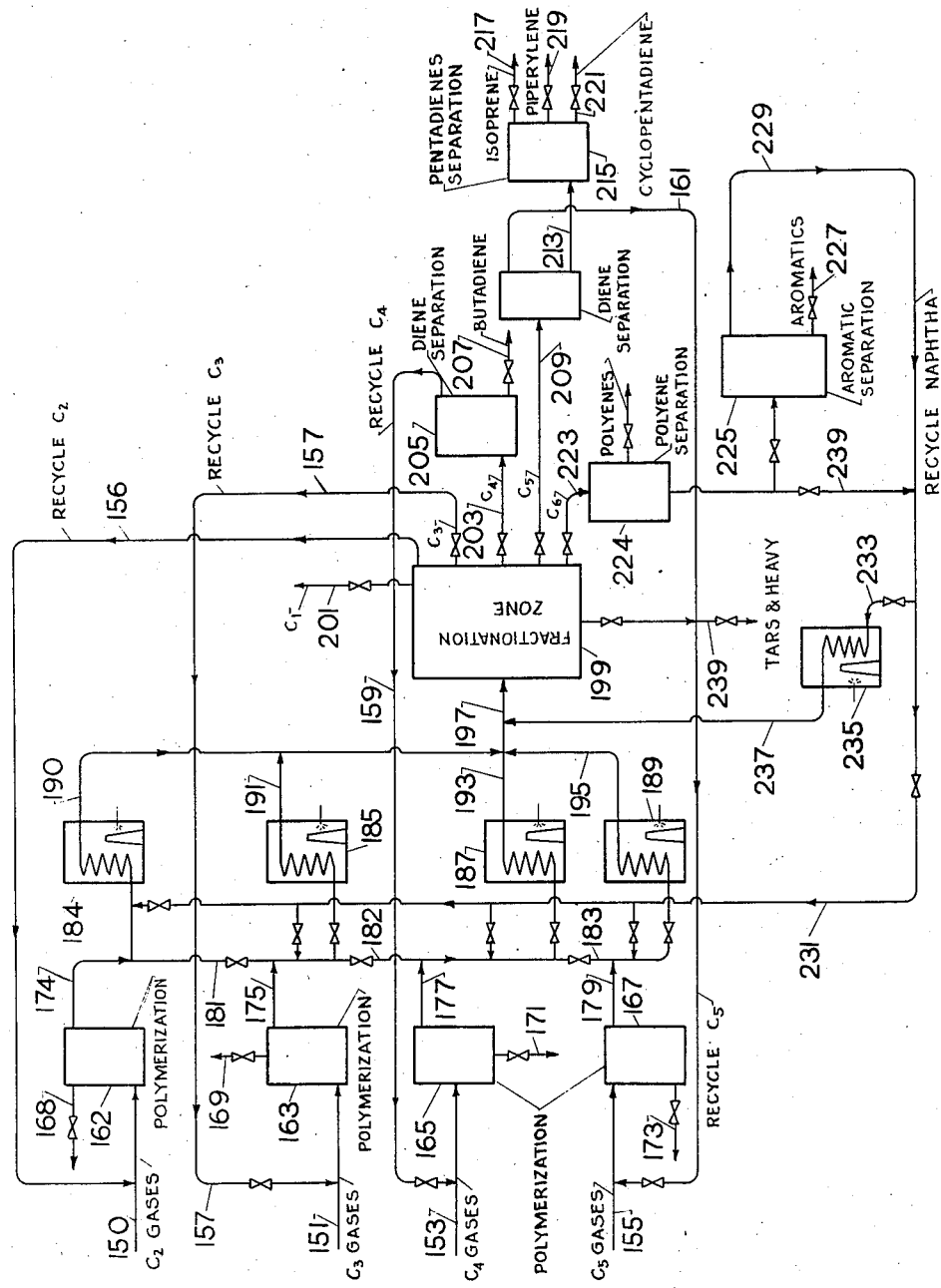
Fig. II
Inventors: Martin De Simo
Robert M. Roberts
By their Attorney:

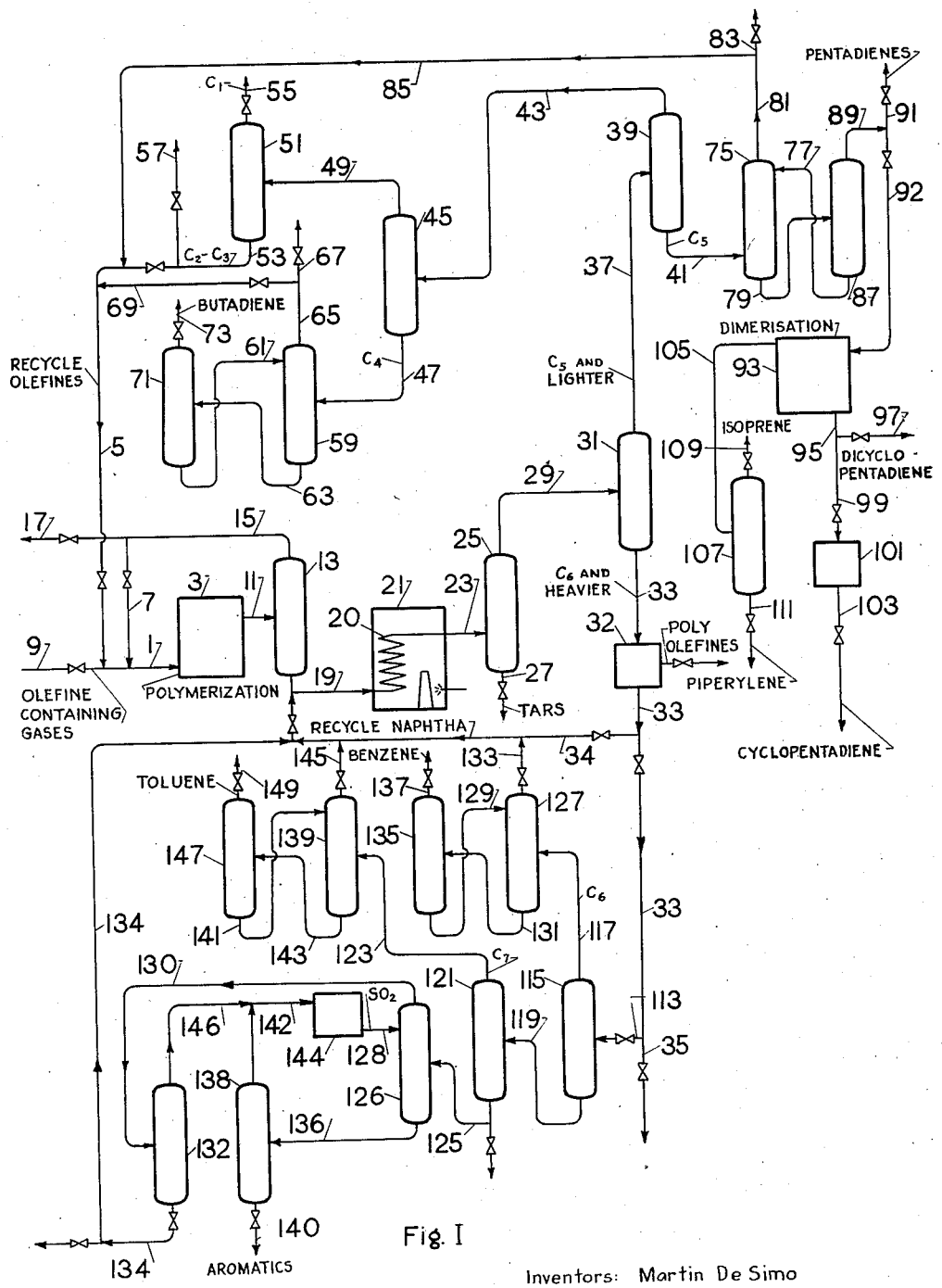
Fig. I
Inventors: Martin De Simo
Robert M. Roberts

Patented Jan. 18, 1944

2,339,560

UNITED STATES PATENT OFFICE 2,339,560

PRODUCTION OF DIENES

Martin de Simo, Piedmont, and Robert M. Roberts, Berkeley, Calif., assignors to Shell Development Company, San Francisco, Calif., a corporation of Delaware Application May 27, 1941, Serial No. 395,356

10 Claims. (Cl. 260—680)

This invention relates to the art of cracking hydrocarbons and more especially to the manufacture of diolefines and other valuable products by vapor phase cracking of selected feeds.

Diolefines, and especially butadiene, isoprene and piperylene, are useful as starting materials in the manufacture of elastomers, that is, polymeric materials having elastic properties similar to rubber and finding successful applications in different arts.

It is well known to prepare dienes by dehydrogenation of corresponding olefines, by dehalogenation or dehydrohalogenation of corresponding halogen derivatives, dehydration of corresponding alcohols, etc. These methods, however, have certain disadvantages, for example, the cost involved in preparing the starting materials.

It is also known that cracking of hydrocarbons often yields minor proportions of dienes, particularly of butadiene. The proportion of the diene in the cracked products is, however, small and it is associated with major amounts of saturated and ethylenic hydrocarbons having nearly equal vapor pressures. Thus, the recovery of the dienes is difficult and their yields are small.

It is an object of this invention to provide a process for the manufacture of valuable hydrocarbons, especially dienes and particularly pentadienes, by cracking a selected hydrocarbon stock which is readily available. Another object is to produce hydrocarbon fractions rich in di- and mono-olefines and aromatic hydrocarbons, respectively, from which the dienes can be separated in a simple manner. Still further objects include simplified procedures, decreased cost in the manufacture of dienes, and other improvements found hereinafter.

We have found that gases obtained by vapor phase cracking of olefine polymers contain substantial amounts of dienes and that selected fractions of such gases may comprise major proportions, i. e. over 50%, of pentadiene and particularly of isoprene.

According to this invention, a cracking stock composed of normally liquid olefine polymers obtained by polymerizing normally gaseous olefines, and preferably of dimers, trimers or tetramers of propylene or their mixtures, is cracked in the vapor phase at temperatures above about 600° C. and pressures not substantially above atmospheric for a time to gasify and transform in one or several passes a major portion of said polymers into normally gaseous products.

The normally liquid olefine polymers which comprise the cracking stock of this process may be obtained from ethylene, propylene, butylenes or amylenes, or a mixture thereof by thermal or preferably catalytic polymerization. These polymers comprise predominantly branched acyclic mono-olefines including substantial amounts of tertiary olefines. A cracking stock which boils within the gasoline range and especially one boiling below about 150° C. is preferred, giving in general higher yields of dienes. However, it may include or may consist essentially of products boiling above about 150° C.

When compared with the known process of producing dienes by thermal treatment of butylenes, our method has the advantage of using as a cracking stock a feed which predominates in readily-available mono-olefines, all of which yield high percentages of dienes on cracking. In order to produce a comparable butylene feed from gases containing butylenes, it would be necessary to resort to complicated and expensive fractionations. Thus, the use of the polymers simplifies the production of dienes in relatively high concentrations and makes it more economical than the corresponding cracking of butylenes. Moreover, polymers of ethylene and propylene form suitable cracking stocks, whereas the monomers upon cracking do not yield substantial amounts of dienes.

The vapor phase cracking is conducted so as to gasify 15%–85% of the feed per pass. We define as gasified that part of the cracking products which consists of molecules having less than six carbon atoms.

The cracking temperature, i. e. the maximum temperature to which the cracking stock is heated, is above 600° C., preferably 650° C.–850° C.

The resulting cracked products are quenched rapidly to temperatures below about 400° C. and are fractionally distilled preferably under conditions to produce separate $C_4$ and $C_5$ fractions, and from them dienes which constitute substantial proportions thereof are isolated by conventional methods. Other products obtained in this process include, besides the dienes, tar and products heavier than gasoline, gasoline and gases lighter than gasoline containing high percentages of mono-olefines.

These products may be withdrawn, treated and used as may be convenient. Certain portions of them may, however, advantageously be utilized within the process. Thus, mono-olefines may be repolymerized to polymers which then may form part of the stock for the cracking process.

The composition of the cracked gasoline fraction varies with the intensity of the cracking, i. e. it may be predominantly olefinic, e. g. having substantially retained the composition of the cracking feed if the original cracking stock boils within gasoline boiling range, or it may have become more or less aromatic.

If the cracking is relatively superficial, i. e. the gasification per pass is of the order of 25%, for example 15%–40% and preferably 20%–30%, the ungasified portion of the cracking stock is predominantly olefinic. The latter is advantageously recracked and treated like the original cracking stock, for example, by recirculation as part of said stock.

If the cracking is deep, i. e. the gasification is of the order of 65%, for example 50%–85% and preferably 60%–70%, the gasoline fraction of the cracked products may contain substantial amounts of aromatic hydrocarbons which apparently are formed by secondary reactions such as polymerization or condensation of the primary products. In this case, it is advantageous to separate valuable aromatic hydrocarbons such as benzene, toluene, styrene, etc., and to further crack the remaining aromatic-free gasoline.

The cracking may also be conducted for intermediate gasification such as about 45%–50%, but this is less desirable as it produces aromatics in small though appreciable amounts which are sufficiently large to be objectionable in cracking, yet not large enough to make their recovery desirable.

The gasoline fraction may also contain poly-olefines having six and more carbon atoms. These hydrocarbons may be desirable in themselves, or may interfere in the cracking because of their tendency to polymerize, or in the recovery of aromatics with the aid of selective solvents because of their solubility therein, which comes close to that of aromatics. It is thus often desirable to separate and eliminate them.

The heavier-than-gasoline products and tars constitute, in general, only a minor proportion of the cracked products and can be disposed of as convenient. However, if a substantial proportion of the original cracking stock boils above the gasoline boiling range, some unchanged constituents may be found in this fraction. These may advantageously be separated from tars and, if necessary, from aromatics and poly-olefines and be returned for further cracking.

The cracking in this process is conducted at pressures of about atmospheric or below, and preferably not substantially above 100–150 lbs. p. s. i. Thus, pressures above atmospheric sufficient to overcome the resistance of conduits, condensers and other equipment which follow the cracking zone may be maintained therein. If desired, the cracking may be conducted in the presence of steam, nitrogen and other substantially inert gases. Amounts of these gases up to 80% by weight of the mixture may be used.

The heating of the hydrocarbons to this cracking temperature may be achieved by contact with a heated surface, for example in an externally heated coil or a preheated brick checker work, or by admixture of hot, substantially inert gases; or by a combination of both methods.

In order to prevent excessive coke formation in the cracking zone, the contact in this zone of ferrous metals with the hydrocarbons should be avoided. Materials which do not cause rapid coke formation such as copper-containing alloys, e. g. aluminum- or phosphor-bronze, or refractory ceramics, are thus preferred in the construction of surfaces which are exposed to hydrocarbons at cracking temperatures.

The velocity at which the gases pass through the cracking zone depends on the exact result desired, the temperature and pressure of cracking, and the dimensions of the cracking zone. The space velocity necessary to produce the desired degree of gasification increases rapidly as the cracking temperature is raised. The real velocity of the gaseous hydrocarbons in the cracking zone is very difficult to determine accurately because the volume of the cracking stock changes rapidly under the cracking conditions. Therefore, in defining this invention, we prefer to utilize the concept of liquid space velocity which is the liquid volume of the feed delivered to the cracking zone per volume of said zone per hour. The cracking zone is defined as the space occupied by gas in which the temperature is within 20° C. of the maximum cracking temperature. Liquid space velocity can be accurately measured and, for a given pressure, temperature and dilution, determines the real space velocity of the vapors.

Our process is illustrated in the accompanying drawings which represent simplified flow diagrams of two embodiments of this invention.

Figure I illustrates the principal steps of this process.

Figure II illustrates a useful modification of this process.

For simplicity, the drawings do not show pumps, heat exchangers, valves, by-passes, vents, reboilers, condensers and other auxiliaries, the proper placement of which will be at once evident to those skilled in the art.

In the embodiment illustrated in Figure I, gases containing olefines enter the polymerization zone 3 through conduit 1. These gases are admitted from an outside source not shown through line 9 and are advantageously supplemented by gases produced within this process, as will be described later, and supplied through conduits 5 or 7, or both. It is desirable that these gases contain a substantial proportion of propylene and may be mixed and compressed by conventional means not shown.

The olefines contained in the gases supplied to polymerization zone 3 through line 1 are polymerized, preferably in the presence of polymerization catalysts, to form normally liquid polymers having six and more carbon atoms in the molecule. A preferred mode of polymerization comprises passing the gases at pressures of about 200 to 1800 lbs. p. s. i. at 425° C.–475° C. over solid phosphoric acid catalyst. Other catalysts that may be suitable are listed, for example, in National Petroleum News of November 20, 1935, page 45 and following, and in U. S. Patent 2,171,207.

The resulting polymers are conducted through line 11 to the polymer stabilizer 13 wherein the polymers are separated from the unreacted gases which are taken overhead through line 15 and may either be withdrawn completely from the process through line 17, or be returned in part to the polymerization zone 3 through conduit 7.

The stabilized polymer is taken through line 19 and is advantageously commingled with recycle liquids, produced in the system as hereinafter described and introduced through line 34. The mixed liquids are led into cracking coil 20 in furnace 21 in which the desired conditions of temperature, pressure and residence time are maintained, for example, at 750° C., atmospheric pressure and a liquid space velocity of 200, so as to effect a gasification of about 25%.

The cracked products leave reaction coil 20 through line 23 and are separated from tars and other relatively heavy materials in fractionator 25. The lighter products including gases, naphtha and, if desired, gas oils are taken overhead through vapor line 29. The heavier products are withdrawn from the system through line 27.

The products in line 29 pass into stabilizer 31 wherein an overhead fraction consisting essentially of $C_5$ and lighter components is separated from a heavier naphtha fraction; this latter, substantially free of $C_5$ and lighter components, is taken through line 33 and may go through line 35 to storage not shown, or preferably may be returned through lines 34 and 19 to the cracking coil 20.

If desired, the diolefines contained in this naphtha fraction may be separated in zone 32, for example, by extraction with a suitable complex-forming reagent, e. g. $CuCl_2$, $AgCl$, $SO_2$, etc., or by polymerization with or without suitable catalysts such as poly oxy acids, e. g. $H_2SO_4$, $H_3PO_4$, etc., or Friedel-Crafts catalysts, or by the Diels-Alder reaction involving maleic acid anhydride-type reagents, etc.

The overhead $C_5$ and lighter fraction from stabilizer 31 is taken through conduit 37 to a fractionating system wherein it is subjected repeatedly to fractional distillation. In column 39 a bottom fraction is produced comprising predominantly hydrocarbons having five carbon atoms which is taken through line 41, and a lighter fraction substantially free from $C_5$ components. The latter is taken overhead through line 43 to fractionator 45, where a bottom fraction comprising predominantly hydrocarbons having mostly four carbon atoms is produced and withdrawn through line 47. Remaining gases substantially free from $C_4$ and heavier components are taken overhead through line 49 into fractionator 51 where hydrocarbons having two and three carbon atoms are separated as the bottom fraction and pass into line 53. The overhead fraction comprises mainly hydrogen and methane and is withdrawn through line 55 to be discarded from the process.

Thus, separate $C_5$, $C_4$ and $C_2$—$C_3$ fractions are taken through lines 41, 47 and 53, respectively.

The $C_2$—$C_3$ fraction is rich in propylene and ethylene and may, if desired, be eliminated from the process through line 57, but it is preferred to return it through line 5 to the above-mentioned polymerizing zone 3.

The $C_4$ fraction which contains butadiene is led through line 47 to column 59 wherein it is subjected to extractive distillation with a suitable solvent having a relatively high boiling range and greater solvent power for butadiene than for butylenes and butanes. This liquid is supplied to the top of extractor 59 through line 61 and is contacted with the ascending $C_4$ vapors so as to produce a "fat" solvent charged with substantially pure butadiene which is eliminated from the bottom of the column 59 through line 63. This "fat" liquid is separated by fractional distillation in fractionator 71 into the "lean" solvent and butadiene. The butadiene so produced is withdrawn through overhead line 73 while the "lean" solvent is drawn off at the bottom through line 61 and is returned to extractor 59. The butylenes and butanes separated from the butadiene in column 59 are taken through line 65 and may be eliminated from the system through line 67, or more advantageously, may be returned to the polymerizing zone 3 through lines 69 and 5.

The $C_5$ fraction, rich in pentadiene, is given a treatment similar to that of the $C_4$ fraction. Line 41 leads it to column 75 wherein it is extracted in the vapor phase by a lean solvent supplied through line 77. The fat solvent is drawn off through line 79, and the residual pentanes and amylenes are taken through line 81 and may be eliminated from the process through line 83, or, if desired, may be returned to the polymerization zone 3 by way of lines 85 and 5. The fat solvent is fractionally distilled in fractionator 87 to isolate pentadienes which are withdrawn through line 89, while the lean solvent is recirculated through line 77.

Suitable solvents for the vapor phase extraction of dienes include, for example, alcohols such as butyl alcohols, amyl alcohols, cyclohexanol, etc.; aldehydes such as furfural, acrolein, crotonaldehyde, etc.; ketones such as acetone, methyl ethyl ketone, methyl propyl ketone, acetophenone, cyclohexanone; ethers such as di-isopropyl ether, dichlorethyl ether, dioxane; organic nitrogen bases such as aniline, toluidine, phenylhydrazine, ethylene diamine, ethanol diamine; phenols such as phenol, cresol, xylenols; esters such as ethylene chlorhydrin, dimethyl phthalate, diethyl tartrate, ethylene dichloride, lactic acid nitrile, acetonitrile, di-isopropyl or allyl sulfate, ethyl borate or ethyl orthosilicate; other organic derivatives of mineral acids such as nitrobenzene, nitromethane, nitroethane, and many other polar compounds.

The recovered pentadienes usually comprise a mixture of isoprene (1-methyl butadiene), piperylene (n-pentadiene) and cyclopentadiene. This mixture may be either withdrawn through line 91 or, if desired, may be further fractionated to separate the several $C_5$ dienes from one another by leading it through line 92 to vessel 93 where the cyclopentadiene is dimerized by subjecting the mixture to moderate heat in the liquid phase. The resulting product is fractionally distilled, the dimer forming the distillation residue which emerges through line 95 to be withdrawn through line 97, or to be regenerated by exposure to high temperature and vacuum in a depolymerizing zone 101 to which line 99 leads. The vapors of the a-cyclic pentadienes are removed from the dimerization zone 93 through line 105, and may be further separated in fractionator 107 to produce isoprene which is taken overhead through line 109 and piperylene which is obtained at the bottom through line 111.

The process as illustrated in Figure I can also be carried out in a different manner, if desired. The cracking in coil 20 may be intensified, for example, by reducing the space velocity to about 20 under the same conditions of pressure and temperature, so as to obtain a gasification of about 65%. The naphtha fraction produced under these circumstances and taken through line 33 from fractionator 31 contains aromatic hydrocarbons.

These valuable hydrocarbons may be separated and the recycle stock recovered by convenient methods, such as fractional and extractive distillation, or liquid-liquid extraction, or both. For example, the liquid withdrawn through line 33 is led through line 113 to fractionator 115 wherein it is split into a narrow $C_6$ overhead fraction taken through line 117 and a bottom fraction of $C_7$ and heavier components withdrawn through line 119. This line leads to fractionator 121, wherein another narrow $C_7$ overhead fraction is separated and taken through line 123, and a bottom fraction substantially free from $C_7$ hydrocarbons which is withdrawn through line 125, either to be discarded or further treated as will be described.

The $C_6$ and $C_7$ fractions thus separated are rich in benzene and toluene, respectively.

The $C_6$ fraction is conducted through line 117 to column 127 wherein it is subjected to extractive distillation with a lean selective solvent for aromatics introduced through pipe 129. The fat solvent rich in benzene leaves through line 131 and the residual $C_6$ hydrocarbons are withdrawn overhead through line 133 or returned to the cracking coil 20 through lines 34 and 19. The fat solvent is fractionally distilled in fractionator 135 so that the lean solvent is recovered as the bottom fraction and returned through line 129 to extractor 127, and the benzene is obtained overhead through line 137.

The gaseous $C_7$ fraction is conducted through line 123 to column 139 wherein it is extracted with a lean solution solvent for aromatics introduced through line 141. The fat solvent rich in toluene leaves through line 143, and the residual $C_7$ hydrocarbons are withdrawn overhead through line 145 and preferably returned to the cracking coil 20 through lines 34 and 19. The fat solvent is fractionated in fractionator 147, so that the lean solvent is recovered as the bottom fraction and is returned through line 141 to extractor 127. The toluene is obtained overhead through line 149.

Suitable solvents for the recovery of aromatics by extractive distillation are, for example, phenol, cresylic acids, alkyl phenol mixtures, aniline, alkyl anilines, diphenyl amine, ditolyl amines, carbitols (diethylene glycol mono-ethers) such as methyl, ethyl and propyl carbitols, chlorinated dialkyl ethers such as beta-beta-dichlorethyl ether, nitrobenzene, nitrotoluene, nitroxylenes, naphthols, alkyl naphthols, benzo phenone, phenyl tolyl ketone, diphenyl ketone, alkyl phthalates such as dimethyl phthalate, alkyl salicylates such as methyl salicylate, benzyl alcohol, benz chlorides, i. e. benzyl, benzal, and benzo chlorides, benzonitrile, diphenyl oxide, ditolyl oxide, hydroxy pyridine, nitropyridine, chlorinated pyridines, quinoline, isoquinoline, chlorinated quinoline, hydroxy quinolines, 5-nitro quinoline, tetrahydrofurfuryl alcohol, furfural alcohol, furfural, the mono glycerol ethers, such as 1-methoxy glycerol, 2-methoxy glycerol, 1-ethoxy glycerol, 2-ethoxy glycerol, 1-propoxy glycerol, 2-propoxy glycerol, 1-isopropoxy glycerol, 2-isopropoxy glycerol; the glycerol di-ethers such as 1,2-dimethoxy glycerol, 1,3-di-methoxy glycerol, 1,2-di-ethoxy glycerol, 1,3-di-ethoxy glycerol, 1,2-di-propoxy glycerol, 1,3-di-propoxy glycerol, 1,2-di-isopropoxy glycerol, and 1,3-di-isopropoxy glycerol; the mixed di-glycerol ether esters such as 1-ethoxy, 2-methoxy glycerol, 1-methoxy, 3-propoxy glycerol, and 1-ethoxy, 2-isopropoxy glycerol.

The heavier-than-$C_7$ bottom fraction from fractionator 121 obtained through line 125 contains aromatics. The latter are preferably separated by liquid-liquid extraction with a liquid having greater solvent power for aromatics than for olefinic hydrocarbons, for example liquid $SO_2$. For this purpose, the hydrocarbon liquid is delivered by line 125 to extractor 126 wherein it is extracted with liquid $SO_2$ entering through conduit 128. The raffinate passes through line 130 to a stripper 132 wherein it is stripped of the dissolved $SO_2$ and is therefrom preferably returned to the cracking coil 20 through lines 134 and 19. The extract containing aromatics is conveyed from extractor 126 through line 136 into separator 138 wherein a bottom fraction comprising mainly $SO_2$-free aromatics and an overhead fraction of $SO_2$ is produced. The aromatics are obtained through conduit 140 while the $SO_2$ is taken overhead through line 142 to be liquefied in cooler 144 together with the $SO_2$ taken from stripper 132 through line 146. The liquefied $SO_2$ is then reintroduced through conduit 128 into extractor 126.

Other solvents suitable for the liquid-liquid extraction are, for example, nitrobenzene, methyl acetate, phenyl acetate, methyl or ethyl cellosolve, furfural, acetone, aniline, phenol, cresylic acids, dichlorethyl ether, antimony trichloride, $SO_2$-benzene mixtures, or combinations of solvents and anti-solvents such as phenol or cresol with propane, etc.

If desired, the fractionators 115 and 121 may be by-passed and all the aromatics separated by liquid-liquid extraction, as described, or alternatively, if desired, the liquid-liquid extraction step may be replaced by further fractional and extractive distillation of the several fractions.

The above embodiment of our invention which utilizes single polymerization and cracking zones is advantageous, if the majority of the olefines of the feed to the polymerization zone 3 consists of a single specie, e. g. propylene. If several olefines are present and in substantial amounts, it may be difficult to polymerize them completely and simultaneously under one set of conditions without reducing appreciably the life of the catalyst. Furthermore, the polymers obtained are heterogeneous so that the cracking conditions suitable for one may produce excessive or insufficient gasification of the others.

Thus, when it is desired to utilize several different olefines in the feed, the embodiment of this process illustrated in Figure II may be preferred.

Several narrow hydrocarbon fractions, each comprising predominantly a single olefinic specie, enter the process separately. For example, $C_2$, $C_3$, $C_4$ and $C_5$ hydrocarbon gases containing the corresponding olefines are admitted from sources not shown through lines 150, 151, 153 and 155, respectively. Corresponding olefine-rich gases produced in the system, as hereinafter described, may advantageously be added thereto through lines 156, 157, 159 and 161, respectively. The gases are introduced into their respective polymerization zones 162, 163, 165 and 167 wherein the olefines are polymerized and the polymer separated from the residual gases which are withdrawn through lines 168, 169, 171 and 173, respectively.

The polymerization conditions maintained in the polymerization zones are adapted to the particular feed to be treated. For example, in the presence of solid phosphoric acid catalyst, preferred conditions are:

| Fraction | Temperature | Pressure |
|---|---|---|
| | °F. | Lbs. p. s. i. |
| $C_2$ | 425–450 | 2,500 |
| $C_3$ | 450–475 | 1,550 |
| $C_4$ | 440–450 | 1,000 |
| $C_5$ | 460–480 | 700 |

The stabilized polymers thus produced are taken through lines 174, 175, 177 and 179 and may be either commingled in lines 181, 182 and 183 to be cracked in one of the cracking zones 184, 185, 187 and 189, or preferably are led to these zones separately to be cracked so as to obtain the desired degree of gasification of each feed. For example, if the temperature of the cracking zones is 750° C., suitable liquid space velocities are 7, 10, 15 and 20, respectively, so as to gasify about 65% of the feed.

The cracked products emerging from the furnaces by lines 190, 191, 193 and 195, respectively, are commingled with each other and may advantageously be combined with the other cracked products produced in the system, as hereinafter described, introduced through line 237. The resulting mixture is subjected to distillation in fractionation zone 199 so as to produce several narrow fractions comprising predominantly $C_1$ and lighter, $C_2$, $C_3$, $C_4$, $C_5$, $C_6$ and heavier, and tar, respectively.

The $C_1$ and lighter fraction is withdrawn through line 201.

The $C_2$ fraction, rich in ethylene, is obtained through line 156 and preferably returned to the polymerization zone 162.

The $C_3$ fraction, rich in propylene, passes through line 157 and is preferably returned to the polymerization zone 163.

The $C_4$ fraction contains butadiene and is taken through line 203 to be further treated in zone 205 so as to isolate the butadiene which is withdrawn through line 207. The residual gases from this operation, comprising mainly butanes and butylenes, are removed through line 159 and preferably returned to polymerization zone 165.

The $C_5$ fraction, rich in pentadienes, is conducted through line 209 to zone 211 wherein pentadienes are recovered and withdrawn through line 213. They may, if desired, be further separated in separating zone 215 so as to yield substantially pure isoprene, piperylene and cyclopentadiene which may be taken through lines 217, 219 and 221, respectively. The residual $C_5$ gases containing substantial amounts of amylenes are eliminated from the diene-recovery zone 211 through line 161 and are preferably returned to polymerization zone 167.

The separation of dienes may be conducted as described above by extractive distillation or other vapor phase extraction with similar solvents; or by azeotropical distillation in the presence of anhydrous ammonia, methylamine, $CO_2$, lower alcohols, etc.; or by liquid-liquid extraction with acetone, furfural, aniline, phenol, etc.; or through formation of complex compounds with copper or silver salts, $SO_2$, etc.; or by polymerization under the influence of heat, pressure, light, or catalysts such as Na, K, $H_2SO_4$, $H_3PO_4$, $P_2O_5$, $AlCl_3$, etc.; or a combination thereof.

The $C_6$-and-heavier fraction which contains aromatics is conducted through line 223 and may be separated from polyolefines in zone 224, and is led into zone 225 wherein it is treated to produce an aromatic fraction which is withdrawn through line 227, and an aromatic-free fraction which is preferably further cracked. For this purpose, it may be returned through lines 229 and 231 to one or more of the cracking zones 184, 185, 187 and 189. The composition of this fraction is, however, different from any one of the original cracking stocks and therefore it is often preferable to crack it in a separate cracking zone 235, to which line 233 leads and where cracking conditions are maintained for the desired gasification, for example, at 750° F. at a space velocity of about 25. The cracked products are obtained therefrom through line 237 and are introduced into the fractionating zone 199 through line 197.

In the embodiment illustrated in Figure II, the cracking has been conducted so as to produce both diolefines and aromatics. If it is desired to avoid the production of aromatics, it may be modified by cracking so as to produce a gasification of only about 25%, for example, by lowering the temperature of cracking zones by 50° C. while maintaining the same liquid space velocities or by increasing the space velocity while maintaining the same temperatures. In this case the separation zone 225 is by-passed through line 239.

It may sometimes be preferred to separate the dienes or the aromatics, or both, without prefractionation or following a degree of fractionation less thorough than described. Alternatively, it may also sometimes be desirable to produce a sharper fractionation before further recovery or to use directly fractions rich in dienes or aromatics, or both, produced by very sharp fractionation.

The following examples illustrate this process:

Example I

Propylene was polymerized over a phosphoric acid catalyst. The polymer obtained boiled from 72° C. to 218° C., had a density D 20/4=0.7373 and a bromine number=134. It was cracked at 750° C. and at a liquid space velocity of 35.5 in a bronze tube packed with quartz chips at substantially atmospheric pressure so as to give a 59% gasification. The resulting products comprised (calculated in weight percent on the charge):

| | Per cent |
|---|---|
| Hydrogen | .4 |
| Methane and lighter | 11.6 |
| $C_2$ cut (63% ethylene) | 13.6 |
| $C_3$ cut (90% propylene) | 9.6 |
| Butadiene | 2.3 |
| Other $C_4$ (93% butylenes) | 7.6 |
| Pentadienes | 7.7 |
| Other $C_5$ (93% amylenes) | 5.8 |
| Heavier-than-$C_5$ and loss | 41.1 |

Example II

Butylene was polymerized over phosphoric acid catalyst. The polymer obtained had a density D 20/4=0.7403, a bromine number=150, an initial boiling point of 75° C. and a 95% point of 300° C. It was cracked at 700° C. and at a liquid space velocity of 13.2, giving a gasification of 55%. The products comprised:

| | Per cent |
|---|---|
| Hydrogen | .2 |
| Methane and lighter | 10.6 |
| $C_2$ cut (68% ethylene) | 8.8 |
| $C_3$ cut (73% propylene) | 10.8 |
| Butadiene | 1.3 |
| Other $C_4$ (83% butylenes) | 9.1 |
| Pentadienes | 5.7 |
| Other $C_5$ (92% amylenes) | 6.3 |
| Heavier-than-$C_5$ and loss | 45.2 |

Example III

The propylene polymer described in the first example was cracked at 740° C. so as to give a gasification of 61%. The products were:

| | Percent of feed | Percent of fraction |
|---|---|---|
| Hydrogen | .4 | |
| Methane | 15.4 | |
| C₂ cut (75% ethylene) | 14.0 | |
| C₃ cut (92% propylene) | 9.5 | |
| C₄ fraction | 9.3 | |
| Butadiene | 2.0 | 25 |
| Isobutylene | 3.4 | 36 |
| Butylene | 3.6 | 39 |
| Butane | .3 | 3 |
| C₅ fraction | 12.4 | |
| Pentadienes | 8.4 | 68 |
| Amylenes | 3.8 | 30 |
| Pentanes | .2 | 2 |
| 55° C.–90° C. fraction | 8.8 | |
| Benzene | 4.2 | 47 |
| Poly-olefines | 3.6 | 41 |
| Other hydrocarbons | 1.0 | 17 |
| 90° C.–125° C. fraction | 7.5 | |
| Toluene | 5.9 | 78 |
| Poly-olefines | 1.2 | 16 |
| Other hydrocarbons | .4 | 6 |
| 125° C.–140° C. fraction | 3.4 | |
| Xylene | 2.5 | 74 |
| Poly-olefines | .6 | 18 |
| Other hydrocarbons | .2 | 8 |
| 140° C.–200° C. fraction | 7.2 | |
| Above 200° C | 8.1 | |
| Loss | 4.1 | |

The pentadienes had the following composition:

| | Per cent |
|---|---|
| Isoprene | 79 |
| Piperylene | 9.5 |
| Cyclopentadiene | 11.5 |

The original polymer had an A. S. T. M. octane number of 83. The gasoline boiling from 55° C. to 200° C. obtained from the cracked products in a yield of 26.8% had an octane number of 86.

We claim as our invention:

1. In the process of manufacturing dienes, the steps comprising thermally cracking in the vapor phase at temperatures between 650° C. and 850° C. normally liquid polymers of propylene so as to gasify 15%–85% thereof, and separating dienes from the resulting cracked products.

2. In the process of manufacturing dienes, the steps comprising treating gases containing mono-olefines having 2 to 5 carbon atoms inclusive in a polymerization zone in the presence of a solid phosphoric acid catalyst to produce normally liquid olefine polymers, separating all of said liquid polymers, thermally cracking them in the vapor phase between 650° C. and 850° C. so as to gasify 15%–85% thereof, whereby dienes and olefines are formed, separating from the resulting cracked products dienes and fractions containing olefines having 2 to 5 carbon atoms inclusive, and returning the latter to said polymerization zone.

3. In a process for manufacturing dienes, the steps comprising polymerizing gases containing mono-olefines having 2 to 5 carbon atoms inclusive in a polymerization zone in the presence of a solid phosphoric acid catalyst to produce normally liquid olefine polymers and residual gases, separating said polymers from said residual gases, thermally cracking in the vapor phase at a temperature between 650° C. and 850° C. all of said liquid polymers and a recycle oil produced in the process so as to gasify 15%–85% thereof, whereby dienes and olefines are formed; separating from the resulting cracked products at least four fractions, a diene fraction, a fraction containing olefines having 2 to 5 carbon atoms inclusive, said recycle oil which is substantially free from normally gaseous, aromatic and tarry hydrocarbons, and a tar fraction; and returning said fraction containing olefines to said polymerization zone.

4. A process according to claim 3 wherein the recycle oil is free from polyolefines.

5. In a process for producing dienes and aromatics, the steps comprising polymerizing gases containing mono-olefines having 2 to 5 carbon atoms inclusive in a polymerization zone in the presence of a solid phosphoric acid catalyst to produce normally liquid olefine polymers and residual gases, separating said polymers from said residual gases, thermally cracking in the vapor phase at a temperature between about 650° and 850° C. all of said liquid polymers and a recycle oil produced in the process so as to gasify 50%–85% thereof, whereby dienes, olefines and aromatics are formed, separating from the combined cracked products at least the following fractions: a diene fraction, an aromatic fraction, fractions containing olefines having 2 to 5 carbon atoms inclusive, and said recycle oil which is free from normally gaseous, aromatic and tarry components, and a tar fraction; and returning said olefine fractions to said polymerization zone.

6. In a process for producing dienes, the steps comprising polymerizing in the presence of a solid phosphoric acid catalyst gases containing mono-olefines having 2 to 5 carbon atoms inclusive so as to produce normally liquid polymers and a gaseous residue, separating said polymers from said residue, thermally cracking in the vapor phase between about 650° and 850° C. all of said liquid polymers and a recycle oil so as to gasify 15%–85% thereof, whereby dienes, olefines, and aromatics are formed, fractionally distilling the combined resulting cracked products to produce at least the following fractions: a light normally gaseous fraction substantially free from olefines, a medium normally gaseous fraction substantially free from dienes and containing olefines, a heavy normally gaseous fraction containing olefines and dienes, a normally liquid fraction containing aromatics, and a heavy residue; withdrawing said light gaseous fraction and said heavy residue, separating dienes from the heavier gaseous fraction, and returning the remainder of said fraction and said medium gaseous fraction to said polymerization zone, separating from said normally liquid fractions polyolefines and aromatics, the remainder being said recycle oil which is cracked in the vapor phase.

7. In a process for manufacturing dienes, the steps comprising separately polymerizing in the presence of a solid phosphoric acid catalyst at least two normally gaseous hydrocarbon mixtures containing mono-olefins of different molecular weights in separate polymerization zones to produce normally liquid polymers and residual gases, substantially all the olefins in any one mixture having the same number of carbon atoms per molecule, separating said polymers from said residual gas, thermally cracking in the vapor phase at a temeprature between 650° C. and 850° C. all of said liquid polymers and a recycle oil produced in the process so as to gasify 15% to 85% thereof, whereby dienes and olefins are formed, separating from the resulting cracked products the following fractions: a diene fraction, a gaseous recycle containing olefins having the same number of carbon atoms per molecule, said recycle oil which is free from normally gaseous, aromatic and tarry hydrocarbons, and a tar fraction; and returning said gaseous recycle to one of said polymerizing zones as part of one of said normally gaseous hydrocarbon mixtures.

8. In a process of manufacturing dienes the steps comprising separately polymerizing in the presence of a solid phosphoric acid catalyst at least two normally gaseous hydrocarbon mixtures containing mono-olefins of different molecular weights in separate polymerization zones to produce from each gaseous mixture normally liquid polymers and residual gases, substantially all the olefins in any one mixture having the same number of carbon atoms per molecule, separating said polymers from said residual gases, thermally cracking in the vapor phase between about 650° and 850° C. in separate cracking zones all of each of said several liquid polymers and a recycle oil produced in the system, whereby dienes and olefins are produced, combining the resulting cracked products, separating from said combined products at least the following fractions: a diene fraction, gaseous recycle fractions containing olefins wherein all the olefins in any one gaseous recycle fraction have the same number of carbon atoms per molecule, and said recycle oil which is substantially free from normally gaseous, aromatic and tarry components; and returning the corresponding gaseous recycle fractions to their corresponding polymerizing zones as part of said corresponding normally gaseous hydrocarbon mixtures.

9. In the process of manufacturing dienes the steps comprising treating gases containing mono-olefins having 2 to 5 carbon atoms inclusive in a polymerization zone in the presence of a solid phosphoric acid catalyst to produce normally liquid olefin polymers, separating said polymers, thermally cracking them in the vapor phase between about 650° C. and 850° C. so as to gasify 15% to 85% thereof whereby dienes and olefins are formed, separating from the resulting cracked products dienes and fractions containing olefins having 2 to 5 carbon atoms inclusive, and returning the latter to said polymerization zone.

10. In the process of manufacturing dienes the steps comprising treating propylene in a polymerization zone in the presence of a solid phosphoric acid catalyst to produce normally liquid olefins polymers, separatnig said polymers, thermally cracking them in the vapor phase between about 650° C. and 850° C. so as to gasify 15% to 85% thereof whereby dienes and olefins are formed, and separating dienes from the resulting cracked products.

MARTIN DE SIMO.
ROBERT M. ROBERTS.